United States Patent
Kihara et al.

(10) Patent No.: US 8,286,604 B2
(45) Date of Patent: Oct. 16, 2012

(54) STARTER FOR SMALL ENGINE

(75) Inventors: Taro Kihara, Tokyo (JP); Yoshinori Horikoshi, Tokyo (JP); Hideki Hashiba, Tokyo (JP); Hirotoshi Fujita, Tokyo (JP)

(73) Assignee: Starting Industrial Co., Ltd., Tokyo (JP)

( * ) Notice: Subject to any disclaimer, the term of this patent is extended or adjusted under 35 U.S.C. 154(b) by 40 days.

(21) Appl. No.: 13/010,876

(22) Filed: Jan. 21, 2011

(65) Prior Publication Data

US 2011/0185999 A1 Aug. 4, 2011

(30) Foreign Application Priority Data

Jan. 29, 2010 (JP) ................ P2010-018584

(51) Int. Cl.
*F02N 5/02* (2006.01)

(52) U.S. Cl. .................................. 123/185.14

(58) Field of Classification Search ............. 123/185.1, 123/185.14, 185.2, 185.3

See application file for complete search history.

(56) References Cited

U.S. PATENT DOCUMENTS

| 5,083,534 A | * | 1/1992 | Morishima et al. | ...... 123/185.14 |
| 5,113,816 A | * | 5/1992 | Morishima et al. | ...... 123/179.25 |
| 5,115,773 A | * | 5/1992 | Morishima | ............... 123/179.24 |
| 5,163,392 A | * | 11/1992 | Morishima et al. | ...... 123/179.25 |
| 5,537,966 A | * | 7/1996 | Ohnishi | ................... 123/185.14 |
| 2011/0048361 A1 | * | 3/2011 | Horikoshi et al. | ........ 123/185.14 |

FOREIGN PATENT DOCUMENTS

| JP | 2002-227753 | 8/2002 |
| JP | 2006-342717 | 12/2006 |

* cited by examiner

*Primary Examiner* — Hai Huynh
(74) *Attorney, Agent, or Firm* — Nixon & Vanderhye P.C.

(57) ABSTRACT

According to one embodiment, a starter for a small engine includes: a torque apply unit that applies a torque to a torque-accumulation spring; a rotating member that transmits the accumulated torque to a crankshaft; and a rotation regulation unit that restrains the accumulated torque from being transmitted to the crankshaft, wherein the rotation regulation unit includes: a regulation ratchet provided on a rotating body linked with the crank shaft to rotate therewith; and a pressing unit provided on an engine case to be engaged with the regulation ratchet and to regulate an operation thereof, and wherein the regulation ratchet is disengaged from the pressing unit by the torque accumulated in the torque-accumulation spring when the accumulated torque exceeds a predetermined resilient force, thereby starting the engine.

8 Claims, 9 Drawing Sheets

STARTER FOR SMALL ENGINE

CROSS-REFERENCE TO RELATED APPLICATION(S)

This application claims priorities from Japanese Patent Application No. 2010-018584 filed on Jan. 29, 2010, the entire contents of which are herein incorporated by reference.

FIELD

The present invention relates to a starter that can sufficiently accumulate a torque required for starting an engine, in a torque-accumulation spring.

BACKGROUND

An ordinary starter for a small engine includes a driving pulley, a cam plate, a torque-accumulation spring and a casket. The driving pulley is fixed to a crank shaft of the engine. In the driving pulley, a centrifugal ratchet is provided to be engaged with a cam pawl provided in the cam plate. And, the casket is connected to the cam plate through the torque-accumulation spring.

To start the engine, the casket is rotated by a hand or a motor to accumulate a torque (energy) in the torque-accumulation spring. When the accumulated torque exceeds a rotational resistance of the engine, the accumulated torque is released at a stroke to the crank shaft through the cam plate and the pulley, thereby starting the engine (for instance, see JP-2002-227753-A).

That is, when such a torque as to exceed the rotational resistance of the engine is accumulated in the torque-accumulation spring, the engine can be rotated by the accumulated torque. However, the rotational resistance of the engine does not always have a constant resistance value. For instance, when a piston is located around an upper dead point, the rotational resistance of the engine becomes highest, and when the piston is located around a lower dead point, the rotational resistance of the engine becomes lowest.

When the rotational resistance is low, the torque accumulated in the torque-accumulation spring will be released even before the accumulated torque reaches a start torque necessary for starting the engine, and the cam plate will be rotated with an insufficient torque. In this case, since the torque transmitted to the driving pulley does not reach the start torque, the engine can not be assuredly started.

To solve this problem, a rotation regulation unit may be provided to regulate a rotation of a member such as a cam plate until a sufficient torque (energy) is accumulated in a torque-accumulation spring. The rotation regulation unit releases the accumulated torque after the sufficient energy is accumulated to thereby start an engine irrespective of a variation in the rotational resistance of the engine, and (see JP-2006-342717-A).

However, in JP-2006-342717-A, such rotation regulation unit is provided in a starter side. In this case, timing for starting an engine does not occasionally correspond to timing for releasing an accumulated torque due to the difference in types of engine or the variation in starter.

Further, when the starter is attached to the engine, the rotation regulation unit of the starter side needs to be aligned with a crank shaft of the engine side. Such operation is troublesome.

SUMMARY

One object of the present invention is to provide a starter for a small engine in which a rotation regulation unit is provided in an engine side so as to stabilize timing for releasing an accumulated torque and so as to omit a necessity for alignment between a starter side and the engine side.

According to a first aspect of the present invention, there is provided a starter for a small engine, including: a torque apply unit that applies a torque to a torque-accumulation spring arranged in a starter case; a rotating member provided in the starter case to transmit the torque accumulated in the torque-accumulation spring to a crankshaft of the engine; a driving pulley provided integrally with the crankshaft to be engaged with and disengaged from the rotating member; and a rotation regulation unit that restrains the torque accumulated in the torque-accumulation spring from being transmitted to the crankshaft, wherein the rotation regulation unit includes: a regulation ratchet provided on a rotating body at an eccentric position thereof, the rotating body being linked with the crank shaft to rotate therewith; and a pressing unit provided on an engine case to be engaged with the regulation ratchet and to regulate an operation of the regulation ratchet by a predetermined resilient force, and wherein the regulation ratchet is disengaged from the pressing unit by the torque accumulated in the torque-accumulation spring when the accumulated torque exceeds the resilient force, so that the rotating body and the crankshaft are rotated to thereby start the engine.

According to a second aspect of the present invention, there is provided a starter for a small engine, including: a motor that applies a torque to a torque-accumulation spring arranged in an engine case; a gear member that transmits the torque accumulated in the torque-accumulation spring to a crank shaft of the engine; and a rotation regulation unit that restrains the torque accumulated in the torque-accumulation spring from being transmitted to the crankshaft, wherein the rotation regulation unit includes: a regulation ratchet provided on a rotating body at an eccentric position thereof, the rotating body being linked with the crank shaft to rotate therewith; and a pressing unit provided on an engine case to be engaged with the regulation ratchet and to regulate an operation of the regulation ratchet by a predetermined resilient force, and wherein the regulation ratchet is disengaged from the pressing unit by the torque accumulated in the torque-accumulation spring when the accumulated torque exceeds the resilient force, so that the rotating body and the crankshaft are rotated to thereby start the engine.

According to a third aspect of the present invention, there is provided the starter, wherein the rotating body is a fly-wheel of the engine.

According to a fourth aspect of the present invention, there is provided the starter, wherein the rotating body is the gear member.

According to a fifth aspect of the present invention, there is provided the starter, wherein the rotating body is a cam gear provided in the engine between the crank shaft and an intake or exhaust valve.

According to a sixth aspect of the present invention, there is provided a starter for a small engine, including: a lever unit that applies a torque to a torque-accumulation spring arranged in an engine case; a rotating member that transmits the torque accumulated in the torque-accumulation spring to a crank shaft of the engine; and a rotation regulation unit that restrains the torque accumulated in the torque-accumulation spring from being transmitted to the crankshaft, wherein the rotation regulation unit includes: a regulation ratchet provided on a rotating body at an eccentric position thereof, the rotating body being linked with the crank shaft to rotate therewith; and a pressing unit provided on an engine case to be engaged with the regulation ratchet and to regulate an operation of the regulation ratchet by a predetermined resilient force, and wherein the regulation ratchet is disengaged from the pressing unit by the torque accumulated in the torque-accumulation spring when the accumulated torque exceeds the resilient force, so that the rotating body and the crankshaft are rotated to thereby start the engine.

According to the first aspect, the rotation regulation unit includes the regulation ratchet provided at the eccentric position of the rotating body that rotates linkedly with the crankshaft of the engine and the pressing unit that is engaged with the regulation ratchet from the engine case side and regulates an operation of the regulation ratchet by the predetermined resilient force, and when the torque accumulated in the torque-accumulation spring exceeds the resilient force, the regulation ratchet is disengaged from the pressing unit by the torque to release the torque accumulated in the torque-accumulation spring, rotates the rotating body and starts the engine. Accordingly, a sufficient torque can be accumulated in the torque-accumulation spring irrespective of a variation in the rotational resistance of the engine and the engine can be assuredly started.

Further, in the engine side, start timing is fixed to a predetermined timing. Since the rotation regulation unit is provided in the engine side, timing of releasing the accumulated torque can be made to correspond to the start timing. Accordingly, the timing of releasing the accumulated torque can be most efficiently set.

In the related art, when the starter is attached to the engine, the rotation regulation unit of the starter side needs to be aligned with the crankshaft of the engine side. However, since the rotation regulation unit is previously provided in the engine side, an alignment operation is not necessary.

Further, since the rotation regulation unit is accommodated in the engine case, the starter case that accommodates main parts of the starter is not enlarged and an entire structure can be made compact.

According to the second aspect, the rotation regulation unit includes the regulation ratchet provided at the eccentric position of the rotating body that rotates linkedly with the crankshaft of the engine and the pressing unit that is engaged with the regulation ratchet from the engine case side and regulates an operation of the regulation ratchet by the predetermined resilient force. Further, According to the third aspect, the rotating body is formed with the fly-wheel. Accordingly, the same effects as those by the first aspect can be obtained. Effects by the force aspect are the same as those by the first aspect.

According to the fifth aspect, the rotating body is the cam gear provided between the crank shaft of the engine and the intake valve or the exhaust valve. The cam gear of the four cycle engine is set to be rotated once when the crank shaft is rotated twice. In the four cycle engine, when the crank shaft is rotated twice, a stroke of suction, compression, explosion and exhaust is carried out. Accordingly, every time that the cam gear is rotated once, the intake valve and the exhaust valve are opened and closed, namely, a stroke of suction, compression, explosion and exhaust of a piston is carried out. Namely, which stroke that the accumulated torque is to be released can be controlled depending on which place the regulation ratchet is provided in the cam gear. The timing of releasing the accumulated torque can be made to accurately correspond thereto.

According to sixth aspect, since the rotation applying unit that applies the torque to the torque-accumulation spring arranged in the engine case is formed with the lever unit, when the torque is accumulated little by little in the torque-accumulation spring by a reciprocating movement, the rotation of the engine can be regulated.

DETAILED DESCRIPTION

[First Embodiment]

Figure 1:
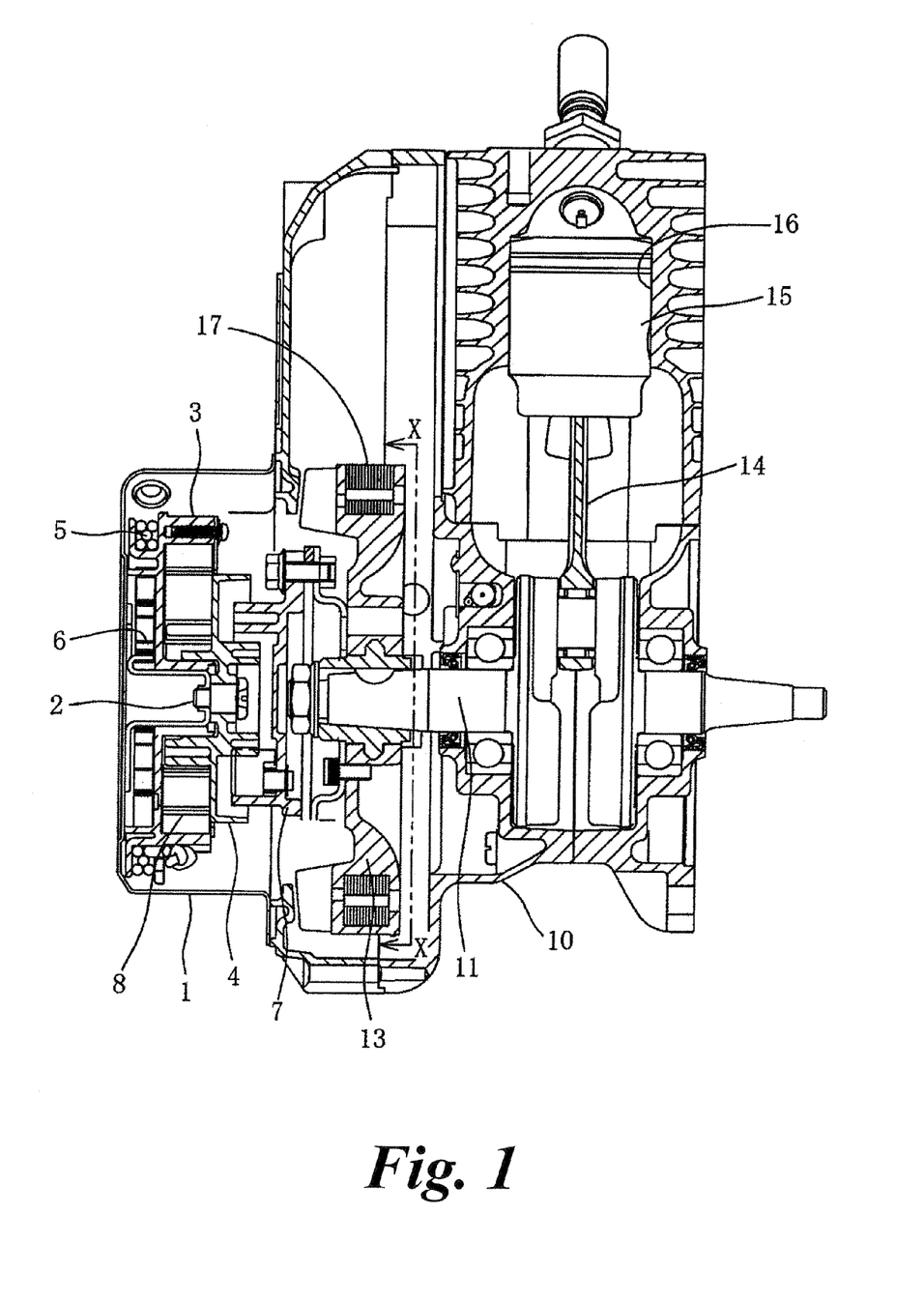
FIG. 1 cross-sectionally illustrates a starter of a first embodiment.

In FIG. 1, a starter case 1 is illustrated. In the starter case 1, a support shaft 2 protrudes to rotatably support a rope reel 3 and a cam plate 4 thereon.

An accommodating groove for a starter rope 5 is formed in an outer peripheral side of the rope reel 3, and an accommodating part of a return spring 6 is formed in an outer side of the rope reel 3. A torque-accumulation spring 8 is accommodated in an inner side of the rope reel 3. One end of the torque-accumulation spring 8 is engaged with the rope reel 3, and the other end is engaged with an end part of the cam plate 4. Although spiral springs are illustrated in the drawing as the return spring 6 and the torque-accumulation spring 8, a coil spring may be used in place of the spiral spring.

The cam plate 4 is a rotating member which can be engaged with a driving pulley 7 fixed to a crank shaft 11 of an engine. The cam plate 4 is rotatably supported by the support shaft 2.

The cam plate 4 and the driving pulley 7 are connected through a clutch, so as to be engaged with and disengaged from each other. For example, such configuration is disclosed in JP-2002-227753-A, and a detailed description and illustration are omitted. A cam pawl is provided in the cam plate 4, and a centrifugal ratchet is rotatably provided in a side surface of the driving pulley 7 so as to be engageable with the cam pawl. When the cam plate is rotated in one direction, the centrifugal ratchet is engaged with the cam pawl so that the cam plate 4 is rotated integrally with the driving pulley 7. When the cam plate is rotated in an opposite direction, the centrifugal ratchet is disengaged from the cam pawl so that the cam plate 4 and the driving pulley 7 are independently rotated.

According to the above-described structure, when the starter rope 5 is pulled, the rope reel 3 is rotated, and the torque-accumulation spring 8 is wound to accumulate a torque. When the accumulated torque reaches a predetermined level or higher, the cam plate 4 is rotated. When the cam plate 4 is rotated, the torque is transmitted to the driving pulley 7.

Then, the rotation of the driving pulley 7 is transmitted to the crank shaft 11 arranged in an engine case 10 to start the engine.

To one end of the crank shaft 11, a fly-wheel (rotating body) 13 connected integrally to the driving pulley 7 is rotatably supported. Further, to the crank shaft 11, a piston 15 slidably accommodated in a cylinder 16 is connected through a connecting rod 14.

In the fly-wheel 13, a magnet 17 is provided, so that a spark can be shot to a plug.

In such a way, the torque is accumulated in the torque-accumulation spring 8 by a rotation applying unit (the rope reel 3 and the starter rope 5). The accumulated torque finally exceeds a rotational resistance of the engine to rotate the cam plate 4 and rotate the crank shaft 11 in accordance with the rotation of the driving pulley 7.

However, for instance, when the rotational resistance of the engine is occasionally low, the cam plate 4 may be rotated with the torque insufficient for starting the engine, so that the torque necessary for starting the engine cannot be transmitted to the driving pulley 7.

A starter for a small engine according to the embodiment has a rotation regulation unit (torque limiter) that restrains the torque accumulated in the torque-accumulation spring 8 from being transmitting to the engine side until the accumulated torque reaches a starting torque necessary for starting the engine irrespective of a variation in the rotational resistance of the engine.

Figure 2:
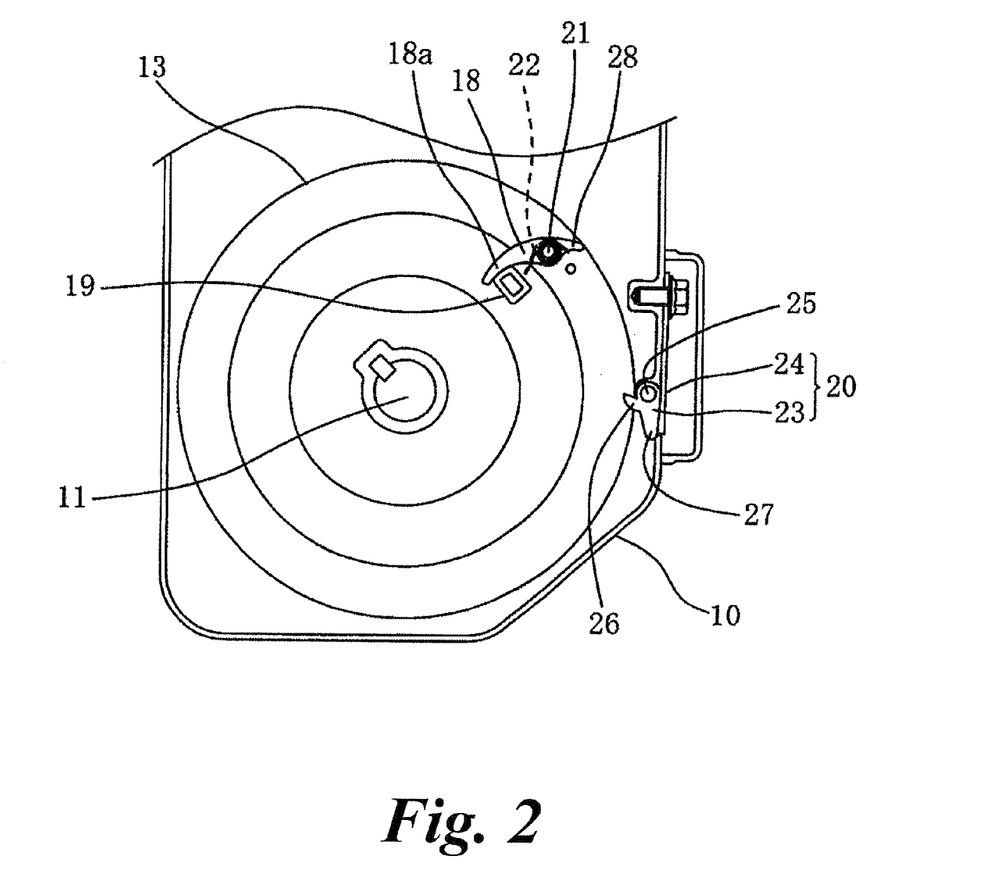
FIG. 2 illustrates a side view of the starter immediately before the rotation of a fly-wheel is regulated, the side view being taken along a line X-X in FIG. 1.

As shown in FIG. 2, the rotation regulation unit includes a regulation ratchet 18 provided in the fly-wheel 13 to be linkedly rotated with the crank shaft 11 of the engine and a pressing unit 20 that regulates an operation of the regulation ratchet 18 by a predetermined resilient force.

The regulation ratchet 18 has a substantially bow-shape in which an intermediate part is bent, and is rotatably provided on a support shaft 21 fixed to an eccentric position deviating from a rotational axis of the fly-wheel 13. Further, one end part 18a of the regulation ratchet 18 is urged to engage with a protruding part 19 provided in one side surface of the fly-wheel 13 by a torsion coil spring 22 wound on the support shaft 21. The other end of the regulation ratchet 18 is provided with an engagement pawl 28.

The pressing unit 20 includes a regulation cam 23 and a leaf spring (resilient unit) 24.

The regulation cam 23 is provided in the engine case 10 side so as to be rotatable through a rotation shaft 25 and has a pressing piece 26 protruding from one end side of the rotation shaft 25 and an engagement piece 27 formed in the other end side. The pressing piece 26 is arranged so as to be engaged with the engagement pawl 28 of the regulation ratchet 18 that protrudes outside the fly-wheel 13. Further, an end of the engagement piece 27 is engaged with an end portion of the leaf spring 24. Then, the engagement piece 27 is pressed to a central side of the fly-wheel 13 by the leaf spring 24 so that the pressing piece 26 is protruded to be engaged with the engagement pawl 28 of the regulation ratchet 18.

In such a way, the leaf spring 24 applies the resilient force to the regulation cam 23 against a rotational force thereof around the rotation shaft 25. The resilient force of the leaf spring 24 is set to a level the same as or higher than the torque (the starting torque) necessary for starting the engine.

Figure 3:
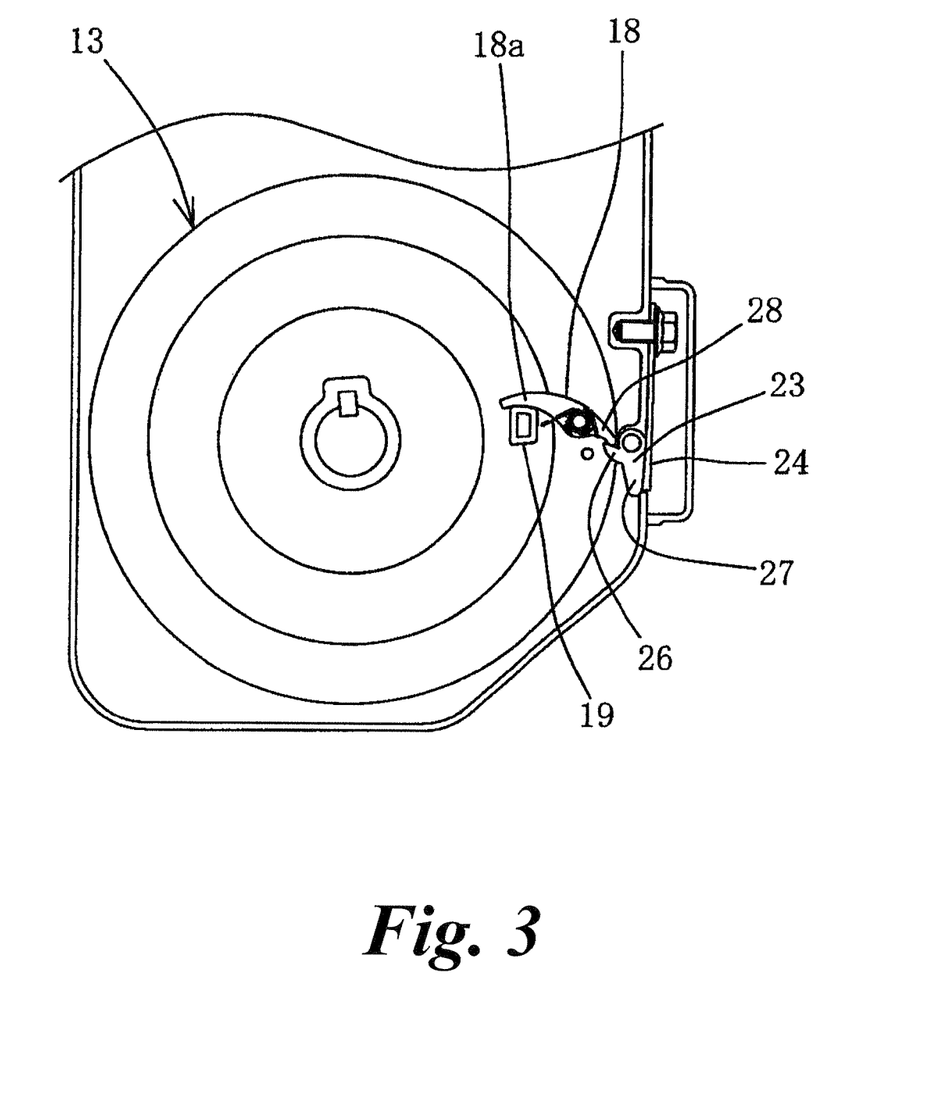
FIG. 3 illustrates the side view where the rotation of the fly-wheel is regulated.
Figure 4:
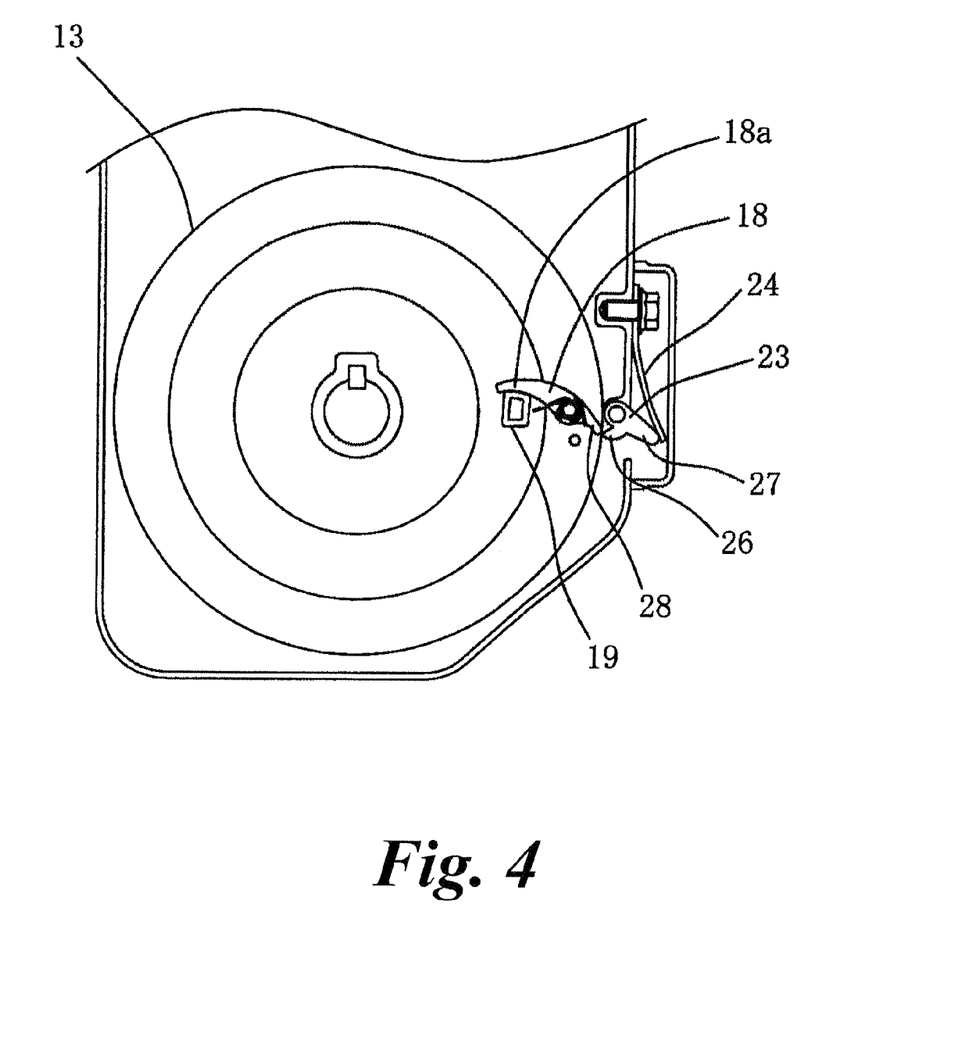
FIG. 4 illustrates the side view immediately before the regulation of the rotation of the fly-wheel is released.
Figure 5:
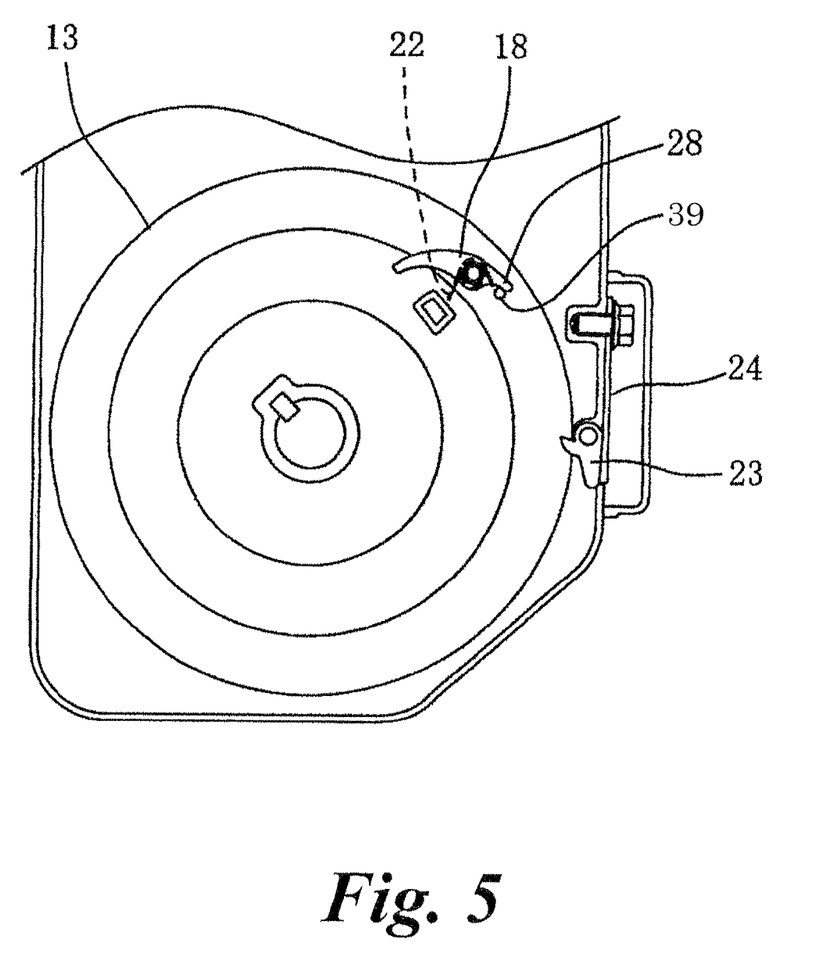
FIG. 5 illustrates the side view where the engine is started by the starter.

An operation of the above-described rotation regulation unit will be described below. Ordinarily, as shown in FIG. 3, since the engagement pawl 28 of the regulation ratchet 18 is engaged with the pressing piece 26 of the regulation cam 23 and the regulation cam 23 holds an engaged state by the resilient force of the leaf spring 24, even when the starter rope 5 is pulled or the rope reel 3 is rotated, the cam plate 4 cannot be rotated. In such a way, when the accumulated torque does not satisfy the spring load (resilient force) of the leaf spring 24 exceeding the rotational resistance of the engine, the cam plate 4 is not rotated. On the contrary, when the torque-accumulation spring 8 is wound and fastened, the torque accumulated in the torque-accumulation spring 8 is increased. When the accumulated torque exceeds the resilient force of the leaf spring 24, as shown in FIG. 4, the pressing piece 26 of the regulation cam 23 is pressed by the engagement pawl 28 of the regulation ratchet 18 to be retracted. Thus, the fly-wheel 13 rotates little by little. Finally, as shown in FIG. 5, the engagement pawl 28 is disengaged from the pressing piece 26. Accordingly, since the torque accumulated in the torque-accumulation spring 8 is released at a stroke, the accumulated torque is transmitted to the cam plate 4. The torque of the cam plate 4 is transmitted to the fly-wheel 13 through the clutch unit to rotate the fly-wheel and the engine is started.

When the engine is rotated, the regulation ratchet 18 is rotated against a resilient force of the torsion coil spring 22 due to a centrifugal force thereof. As shown in FIG. 5, the engagement pawl 28 is retracted inside an outer periphery of the fly-wheel 13 to be disengaged from the regulation cam 23 and is engaged with a pin 39 provided in the fly-wheel 13. Accordingly, the engagement pawl 28 is held in a position where the engagement pawl 28 is not engaged with the protruding pressing piece 26 of the regulation cam 23.

After that, when the rotation of the engine is stopped, the regulation ratchet 18 is rotated by the resilient force of the torsion coil spring 22 and the engagement pawl 28 is returned to a position where the engagement pawl 28 can be engaged with the pressing piece 26 of the regulation cam 23 as shown in FIG. 2 to be located in a stand-by state as shown in FIG. 3.

Since the regulation ratchet 18 can be provided in a dead space eccentric relative to a rotational axis (the crank shaft 11) of the fly-wheel 13, a structure can be made to be compact. Further, since the fly-wheel 13 is provided in the engine side, timing of releasing the accumulated torque can be made to correspond to a start timing fixed to a predetermined timing in the engine side. Accordingly, the timing of releasing the accumulated torque can be most efficiently set.

In the related art, when the starter is attached to the engine, the rotation regulation unit of the starter side needs to be aligned with the crank shaft of the engine side. However, in the present embodiment, since the rotation regulation unit is previously provided in the engine side, an alignment operation is not necessary.

The pressing unit 20 may have a structure for pressing the regulation ratchet 18 and does not necessarily need to be formed with a plurality of members.

For example, the internal structure of the starter is not limited to the above-described form and other known structure may be used. The clutch unit between the cam plate and the driving pulley is also not limited to the above-described form including the centrifugal ratchet and the cam pawl. For instance, a friction-type clutch unit may be used. As a unit for accumulating rotational energy, both of a coil spring and a spiral spring can be used.

[Second Embodiment]

Figure 6:
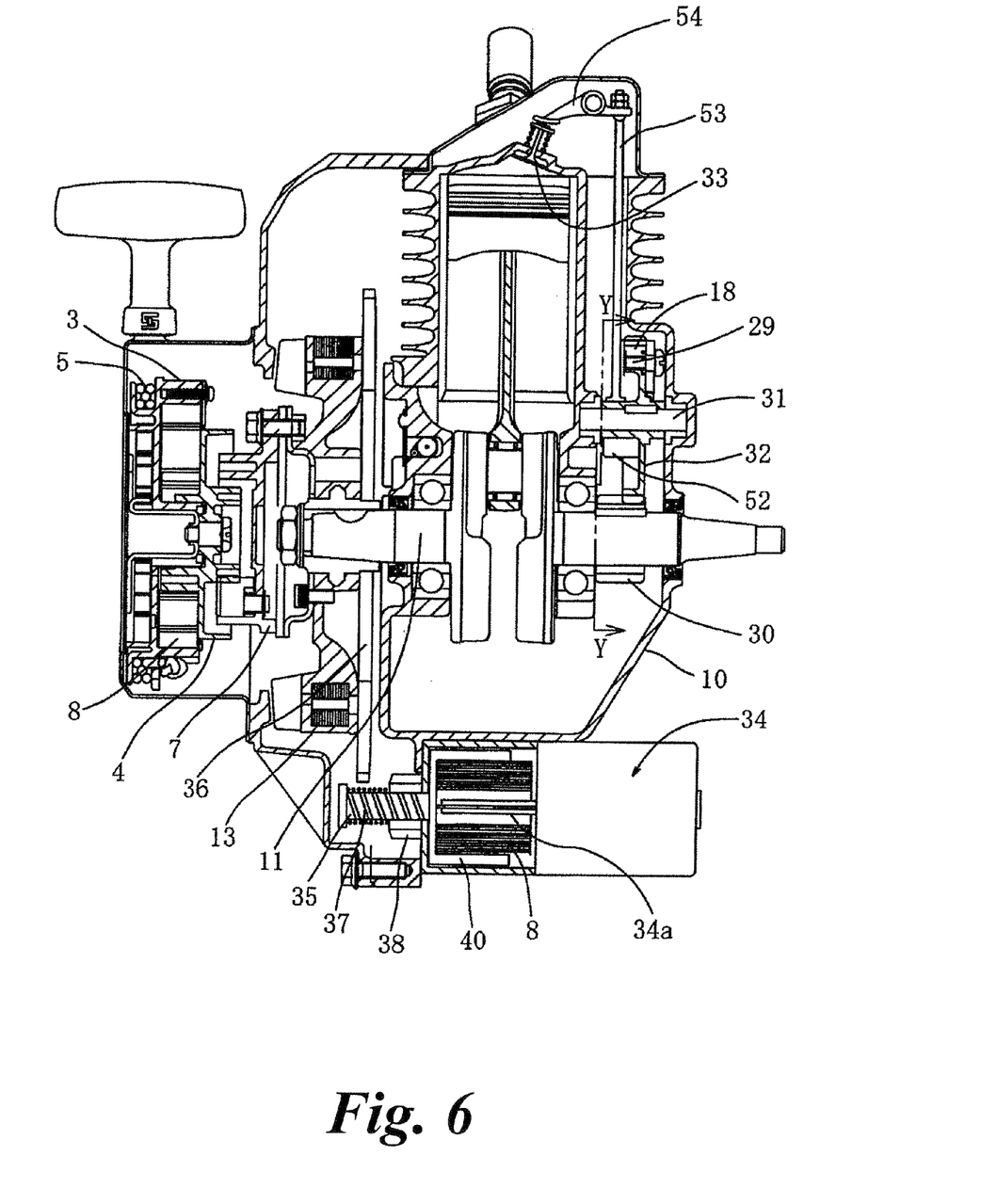
FIG. 6 cross-sectionally illustrates a starter of a second embodiment.

FIG. 6 shows an embodiment where a rotation regulation unit is provided in a four cycle engine. In FIG. 6, with a gear 30 provided at an end part of a crank shaft 11, a cam gear 32 provided in a cam shaft 31 is engaged. An opening and closing operation of an intake valve (or an exhaust valve) 33 is controlled by the rotation of the cam gear 32. In the cam shaft 31, a cam 52 is provided that rotates integrally with the cam gear 32. With the cam 52, a push rod 53 is engaged. The intake valve 33 is associated with the push rod 53 through a rocker arm 54. A gear ratio is set so that when the crank shaft 11 rotates twice, the cam gear 32 rotates once.

The engine can be not only manually started by pulling a starter rope 5, but also started by a motor 34. Since the manual operation is described above, an explanation thereof will be omitted. In the motor operation, a gear member 36 rotating integrally with the crank shaft 11 is arranged so as to be engaged with an output shaft 35 of the motor 34 connected to a battery. With a spiral groove 37 of the output shaft 35, a pinion gear 38 is engaged. When the output shaft 35 is rotated in a starting direction, the pinion gear 38 is moved forward to be engaged with the gear member 36. When the engine is started, the gear member 36 is rotated and the pinion gear 38 relatively begins to be rotated in an opposite direction, the pinion gear 38 is moved backward along the spiral groove 37 and disengaged from the gear member 36. Further, in a housing 40 formed integrally with the output shaft 35, a torque-accumulation spring 8 is arranged. One end of the torque-accumulation spring 8 is engaged with a motor shaft 34a of the motor 34, and the other end is engaged with the housing 40. Thus, when the motor 34 is rotated, a torque is applied to the torque-accumulation spring 8.

The rotation regulation unit includes a regulation ratchet 18 provided in the cam gear 32 to be linkedly rotated with the crank shaft 11 of the engine and a pressing unit 20 that regulates an operation of the regulation ratchet 18 by a predetermined resilient force.

Figure 7:
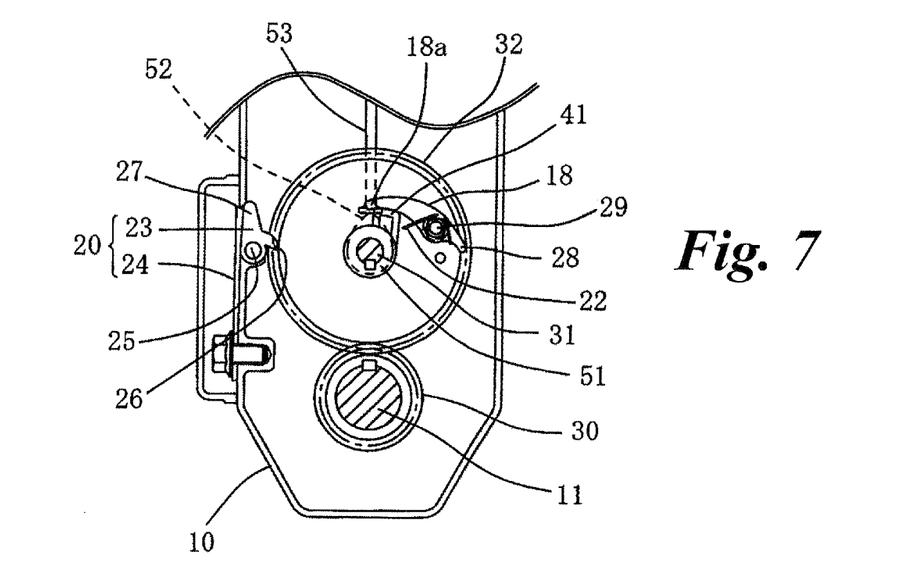
FIG. 7 illustrates a side view of the starter immediately before the rotation of a cam gear is regulated, the side view being taken along a line Y-Y in FIG. 6.

As shown in FIG. 7, the regulation ratchet 18 has a bow-shape in which an intermediate part is bent, and is rotatably provided on a support shaft 29 fixed to an eccentric position deviating from a rotational axis of the cam gear 32. Further, one end part 18a of the regulation ratchet 18 is urged to engage with a protruding part 41 provided in a side surface of the cam gear 32 by a torsion coil spring 22 wound on the support shaft 29. At this time, the other end of the regulation ratchet 18 is provided with an engagement pawl 28.

The pressing unit 20 includes a regulation cam 23 and a leaf spring 24.

The regulation cam 23 is provided in an engine case 10 so as to be rotatable through a rotation shaft 25 and has a pressing piece 26 protruding from one end side of the rotation shaft 25 and an engagement piece 27 formed in the other end side. The pressing piece 26 is arranged so as to be engaged with the engagement pawl 28 of the regulation ratchet 18 that protrudes outside the cam gear 32. Further, an end of the engagement piece 27 is engaged with an end portion of the leaf spring 24. Then, the engagement piece 27 is pressed to an inner side of the engine case 10 by the leaf spring 24 so that the pressing piece 26 is protruded to be engaged with the engagement pawl 28 of the regulation ratchet 18 under this state.

In such a way, the leaf spring 24 applies the resilient force to the regulation cam 23 against a rotational force thereof around the rotation shaft 25. The resilient force of the leaf spring 24 is set to a level the same as or higher than the torque (start torque) necessary for starting the engine.

Figure 8:
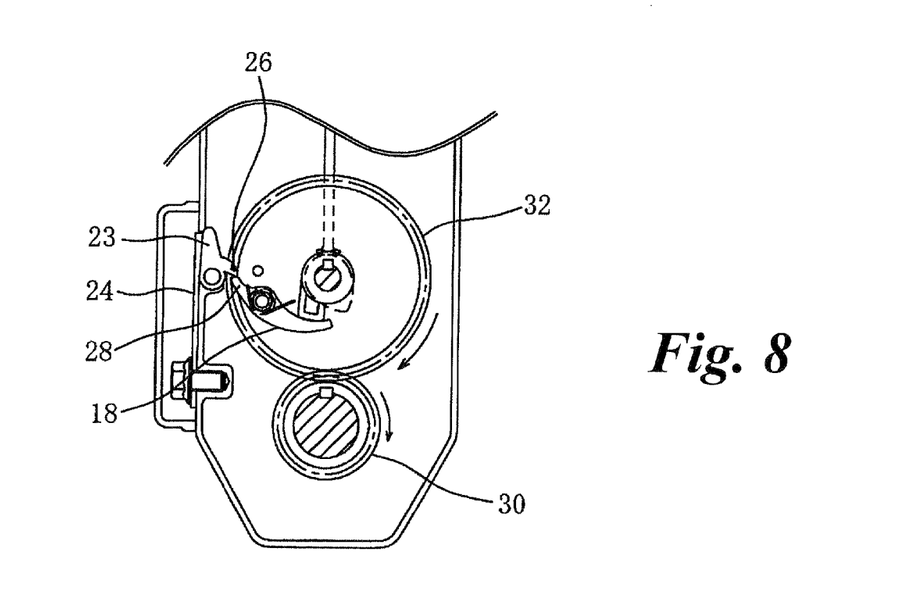
FIG. 8 illustrates the side view where the rotation of the cam gear is regulated.
Figure 9:
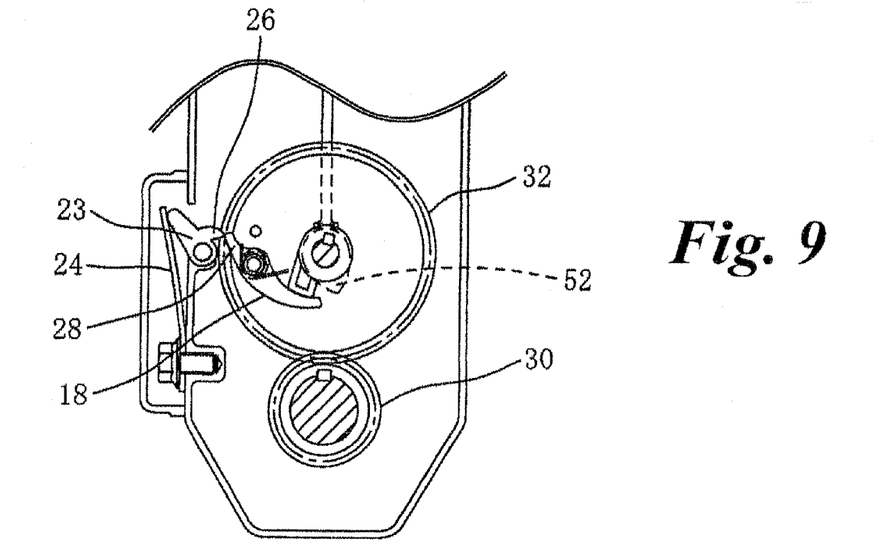
FIG. 9 illustrates the side view immediately before the regulation of the rotation of the cam gear is released.

An operation of the above-described rotation regulation unit will be described below. Ordinarily, as shown in FIG. 8, since the engagement pawl 28 of the regulation ratchet 18 is engaged with the pressing piece 26 of the regulation cam 23 and the regulation cam 23 is held in an engaged state by the resilient force of the leaf spring 24, the crank shaft 11 is hardly rotated. Even when the starter rope 5 is pulled to rotate a rope reel 3 is rotated, or the motor 34 is operated, the crank shaft 11 is not immediately rotated and the torque is accumulated in the torque-accumulation spring 8. When the accumulated torque does not satisfy a spring load (resilient force) of the leaf spring 24 exceeding the rotational resistance of the engine, the crank shaft 11 is not rotated. On the contrary, when the torque-accumulation spring 8 is wound and fastened, the torque accumulated in the torque-accumulation spring 8 is increased. When the accumulated torque exceeds the resilient force of the leaf spring 24, the pressing piece 26 of the regulation cam 23 is pressed by the engagement pawl 28 of the regulation ratchet 18 to be retracted. Thus, the cam gear 32 rotates little by little. Then, finally, as shown in FIG. 9, the engagement pawl 28 is disengaged from the pressing piece 26. Thus, since the cam gear 32 can be rotated and the torque accumulated in the torque-accumulation spring 8 is released at a stroke, the accumulated torque is transmitted to the crank shaft 11 from a cam plate 4, a driving pulley 7 and a fly-wheel 13 in the manual operation, and the torque is transmitted to the crank shaft 11 from the gear member 36 in the motor operation, respectively to start the engine.

Figure 10:
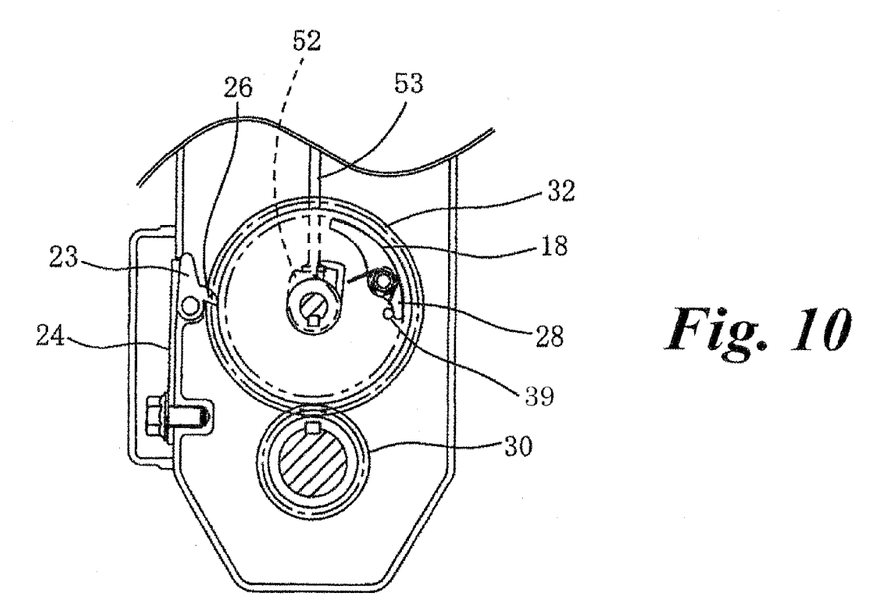
FIG. 10 illustrates the side view where the engine is started by the starter.

When the engine is rotated, the regulation ratchet 18 is rotated against a resilient force of the torsion coil spring 22 due to a centrifugal force thereof. As shown in FIG. 10, the engagement pawl 28 is retracted to be disengaged from the regulation cam 23 and is engaged with a pin 39 provided in the cam gear 32. Accordingly, the engagement pawl 28 is held in a position where the engagement pawl 28 is not engaged with the protruding pressing piece 26 of the regulation cam 23.

After that, when the rotation of the engine is stopped, the regulation ratchet 18 is rotated by the resilient force of the torsion coil spring 22, and the engagement pawl 28 protrudes outside an outer periphery of the cam gear 32 and returns to a position where the engagement pawl 28 can be engaged with the pressing piece 26 of the regulation cam 23 to be located in a stand-by state.

Since the regulation ratchet 18 can be provided in a dead space eccentric relative to a rotational axis of the cam gear 32, a structure can be made to be compact. Further, since the regulation ratchet 18 is attached to the cam gear 32 provided in the engine side, timing of releasing the accumulated torque can be made to correspond to a start timing fixed to a predetermined timing in the engine side. Accordingly, the timing of releasing the accumulated torque can be most efficiently set.

In the above-described embodiment, when the starter is attached to the engine, an alignment operation is not necessary.

Further, the cam gear 32 of the four cycle engine is set to be rotated once when the crank shaft 11 is rotated twice. In the four cycle engine, when the crank shaft 11 is rotated twice, a stroke of suction, compression, explosion and exhaust is carried out. Accordingly, every time that the cam gear 32 is rotated once, the intake valve and the exhaust valve are opened and closed, namely, a stroke of suction, compression, explosion and exhaust of a piston 15 is carried out. Namely, which stroke that the accumulated torque of the torque-accumulation spring 8 is to be released can be controlled depending on which place the regulation ratchet 18 is provided in the cam gear 32. The timing of releasing the accumulated torque can be made to accurately correspond thereto. For instance, in the above-described embodiment, at a position shown in FIGS. 9 to 10, the cam 52 is controlled to operate the push rod 53 and the rocker arm 54 so as to open the intake valve 33.

[Mounting Place of Rotation Regulation Unit]

The above-described rotation regulation unit is provided in the fly-wheel 13 and the cam gear 32. However, a mounting place of the rotation regulation unit may be a rotating body that rotates linkedly with the crank shaft 11 of the engine. The gear member 36 is also a rotating body. Accordingly, the rotation regulation unit may be provided in the gear member 36.

[Torque Apply Unit]

Figure 11A:
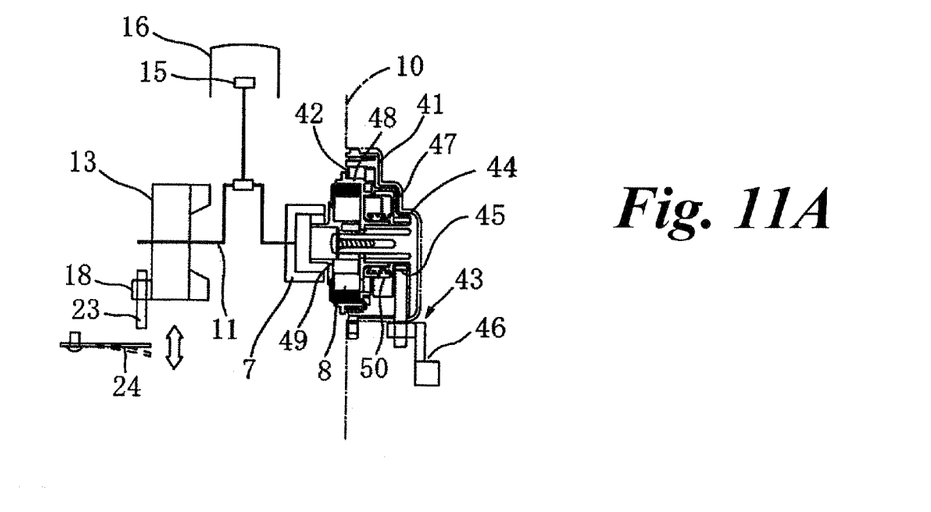
FIG. 11A schematically illustrates a starter with a rotation applying unit by a kick lever.
Figure 11B:
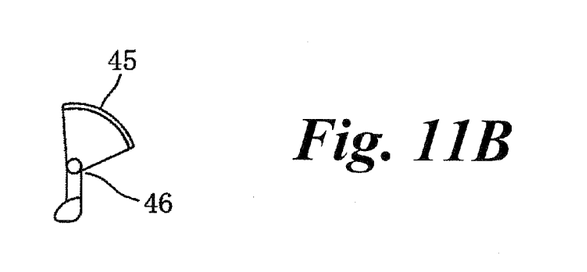
FIG. 11B illustrates a front view of the kick lever.

A unit for applying the torque to the torque-accumulation spring 8 is not limited to the above-described rotating member. For instance, as shown in FIGS. 11A and 11B, there may be provided a structure where a lever unit 43 which applies a torque to a torque-accumulation spring 8 arranged in an engine case 10, a rotating member 49 and a driving pulley 7 which transmit the torque of the torque-accumulation spring 8 to a crank shaft 11, and a rotation regulation unit which restrains the torque accumulated in the torque-accumulation spring 8 from being transmitting to start an engine.

Specifically, the lever unit 43 may include a kick lever 46 integrally provided with a sector-shaped gear 45, a first rotating member 47 having a gear 44 engaged with the sector-shaped gear 45, a second rotating member 48 connected to the first rotating member 47 through a clutch, a torque-accumulation spring 8 accommodated in the second rotating member 48, a rotating member 49 rotating by the torque of the torque-accumulation spring 8 and a driving pulley 7 connected to the rotating member 49 through a clutch. The driving pulley 7 is fixed to the crank shaft 11. Since the rotation regulation unit is the same as that provided in the fly-wheel 13, a detail will be omitted.

Between the first rotating member 47 and the second rotating member 48, a clutch unit 50 is provided. Between the second rotating member 48 and a housing 41, a clutch unit 42 is provided. Thus, only when the first rotating member 47 is rotated in one direction, the second rotating member 48 is rotated. Since the second rotating member 48 cannot be rotated in an opposite direction by the clutch unit 42, even when the first rotating member 47 is rotated in the opposite direction, the second rotating member 48 cannot be rotated and is held under a state that a rotation is stopped.

According to the torque apply unit, when the kick lever 46 is operated in one direction, the first rotating member 47 is rotated, and the torque is accumulated in the torque-accumulation spring 8. When a foot is disengaged from the kick lever 46, the first rotating member 47 is returned to an original position by a spring not shown in the drawing, however, the second rotating member 48 is not rotated in the opposite direction. Accordingly, while the operation is repeated, the power accumulated in the torque-accumulation spring 8 is increased. When the accumulated torque does not satisfy the spring load (resilient force) of a leaf spring 24 exceeding the rotational resistance of the engine, a cam plate 4 is not rotated. On the contrary, when the torque-accumulation spring 8 is wound and fastened, the torque accumulated in the torque-accumulation spring 8 is increased. When the accumulated torque exceeds the resilient force of the leaf spring 24, a fly-wheel 13 rotates little by little. Thus, as shown in FIG. 3, a pressing piece 26 of a regulation cam 23 is pressed by an engagement pawl 28 of a regulation ratchet 18 to be retracted. Finally, as shown in FIGS. 4 and 5, the engagement pawl 28 is disengaged from the pressing piece 26. Accordingly, since the torque accumulated in the torque-accumulation spring 8 is released at a stroke, the accumulated torque is transmitted to the crank shaft 11 to start the engine.

As described above, the torque apply unit may be reciprocated to accumulate the torque little by little in the torque-accumulation spring 8.

The invention claimed is:

1. A starter for a small engine, comprising:
a torque apply unit that applies a torque to a torque-accumulation spring arranged in a starter case;
a rotating member provided in the starter case to transmit the torque accumulated in the torque-accumulation spring to a crankshaft of the engine;
a driving pulley provided integrally with the crankshaft to be engaged with and disengaged from the rotating member; and
a rotation regulation unit that restrains the torque accumulated in the torque-accumulation spring from being transmitted to the crankshaft,
wherein the rotation regulation unit includes:
a regulation ratchet provided on a rotating body at an eccentric position thereof, the rotating body being linked with the crank shaft to rotate therewith; and
a pressing unit provided on an engine case to be engaged with the regulation ratchet and to regulate an operation of the regulation ratchet by a predetermined resilient force, and
wherein the regulation ratchet is disengaged from the pressing unit by the torque accumulated in the torque-accumulation spring when the accumulated torque exceeds the resilient force, so that the rotating body and the crankshaft are rotated to thereby start the engine.

2. The starter of claim 1,
wherein the rotating body is a fly-wheel of the engine.

3. The starter of claim 1,
wherein the rotating body is a cam gear provided in the engine between the crank shaft and an intake or exhaust valve.

4. A starter for a small engine, comprising:
a motor that applies a torque to a torque-accumulation spring arranged in an engine case;
a gear member that transmits the torque accumulated in the torque-accumulation spring to a crank shaft of the engine; and
a rotation regulation unit that restrains the torque accumulated in the torque-accumulation spring from being transmitted to the crankshaft,
wherein the rotation regulation unit includes:
a regulation ratchet provided on a rotating body at an eccentric position thereof, the rotating body being linked with the crank shaft to rotate therewith; and
a pressing unit provided on an engine case to be engaged with the regulation ratchet and to regulate an operation of the regulation ratchet by a predetermined resilient force, and
wherein the regulation ratchet is disengaged from the pressing unit by the torque-accumulated in the torque-accumulation spring when the accumulated torque exceeds the resilient force, so that the rotating body and the crankshaft are rotated to thereby start the engine.

5. The starter of claim 4,
wherein the rotating body is the gear member.

6. The starter of claim 4,
wherein the rotating body is a fly-wheel of the engine.

7. The starter of claim 4,
wherein the rotating body is a cam gear provided in the engine between the crank shaft and an intake or exhaust valve.

8. A starter for a small engine, comprising:
a lever unit that applies a torque to a torque-accumulation spring arranged in an engine case;

a rotating member that transmits the torque accumulated in the torque-accumulation spring to a crank shaft of the engine; and a rotation regulation unit that restrains the torque accumulated in the torque-accumulation spring from being transmitted to the crankshaft, wherein the rotation regulation unit includes:

a regulation ratchet provided on a rotating body at an eccentric position thereof, the rotating body being linked with the crank shaft to rotate therewith; and a pressing unit provided on an engine case to be engaged with the regulation ratchet and to regulate an operation of the regulation ratchet by a predetermined resilient force, and wherein the regulation ratchet is disengaged from the pressing unit by the torque accumulated in the torque-accumulation spring when the accumulated torque exceeds the resilient force, so that the rotating body and the crankshaft are rotated to thereby start the engine.

* * * * *